(12) United States Patent
Oh et al.

(10) Patent No.: US 7,702,937 B2
(45) Date of Patent: *Apr. 20, 2010

(54) METHOD AND APPARATUS FOR OPERATING A COMPUTER SYSTEM BY ADJUSTING A PERFORMANCE STATE OF A PROCESSOR RESOURCE

(75) Inventors: Jang Geun Oh, Kyunggi-Do (KR); Sang Ho Lee, Seoul (KR)

(73) Assignee: ANPA Inc., Seoul (KR)

( * ) Notice: Subject to any disclaimer, the term of this patent is extended or adjusted under 35 U.S.C. 154(b) by 545 days.

This patent is subject to a terminal disclaimer.

(21) Appl. No.: 11/589,280

(22) Filed: Oct. 30, 2006

(65) Prior Publication Data

US 2007/0106917 A1    May 10, 2007

Related U.S. Application Data

(63) Continuation of application No. 09/850,059, filed on May 8, 2001, now Pat. No. 7,131,016.

(30) Foreign Application Priority Data

May 15, 2000    (KR) ................................ 2000-25787

(51) Int. Cl.
*G06F 1/32* (2006.01)
(52) U.S. Cl. ..................... 713/322; 713/300; 713/320; 713/323
(58) Field of Classification Search ................... 713/322
See application file for complete search history.

(56) References Cited

U.S. PATENT DOCUMENTS

| | | | |
|---|---|---|---|
| 5,167,024 A | 11/1992 | Smith et al. ................. 395/375 |
| 5,239,652 A | 8/1993 | Seibert et al. ............... 395/750 |
| 5,355,484 A | 10/1994 | Record et al. ............... 717/127 |
| 5,463,775 A | 10/1995 | DeWitt et al. ............... 702/186 |
| 5,475,848 A | 12/1995 | Ikeda .......................... 713/322 |
| 5,511,205 A | 4/1996 | Kannan et al. .............. 395/750 |
| 5,537,656 A | 7/1996 | Mozdzen et al. ............ 713/323 |
| 5,586,332 A | 12/1996 | Jain et al. .................... 395/750 |
| 5,590,341 A | 12/1996 | Matter ......................... 395/750 |

(Continued)

FOREIGN PATENT DOCUMENTS

JP    10143274 A    5/1998

(Continued)

OTHER PUBLICATIONS

WinTasks 4 Professional User's Manual (no date).

(Continued)

*Primary Examiner*—Nitin C Patel
(74) *Attorney, Agent, or Firm*—Carlineo, Spicer & Kee, LLC

(57) ABSTRACT

A method, apparatus or stored program for adjusting the clock throttle rate of a central processing unit (CPU) included in a computer, in which the usage of the CPU is measured, so that the clock throttle rate of the CPU can be automatically adjusted on the measured usage of the CPU, thereby reducing the consumption of electric power without any influence on the performance of the computer.

21 Claims, 4 Drawing Sheets

U.S. PATENT DOCUMENTS

| | | | | |
|---|---|---|---|---|
| 5,623,647 | A | 4/1997 | Maitra | 713/501 |
| 5,719,800 | A | 2/1998 | Mittal et al. | 364/707 |
| 5,754,436 | A | 5/1998 | Walsh et al. | 364/483 |
| 5,761,517 | A | 6/1998 | Durham et al. | 395/750.04 |
| 5,768,602 | A | 6/1998 | Dhuey | 395/750.04 |
| 5,784,628 | A | 7/1998 | Reneris | 395/750.01 |
| 5,787,294 | A | 7/1998 | Evoy | 713/320 |
| 5,797,115 | A | 8/1998 | Fuller | 702/186 |
| 5,799,198 | A * | 8/1998 | Fung | 713/323 |
| 5,812,860 | A | 9/1998 | Horden et al. | 395/750.04 |
| 5,825,674 | A | 10/1998 | Jackson | 713/321 |
| 5,838,976 | A | 11/1998 | Summers | 717/130 |
| 5,983,357 | A | 11/1999 | Sun | 713/324 |
| 6,003,061 | A | 12/1999 | Jones et al. | 709/104 |
| 6,006,248 | A | 12/1999 | Nagae | 709/105 |
| 6,009,452 | A | 12/1999 | Horvitz | 709/102 |
| 6,029,119 | A | 2/2000 | Atkinson | 702/132 |
| 6,049,798 | A | 4/2000 | Bishop et al. | 707/10 |
| 6,076,171 | A | 6/2000 | Kawata | 713/501 |
| 6,079,025 | A | 6/2000 | Fung | 713/323 |
| 6,092,095 | A | 7/2000 | Maytal | 709/100 |
| 6,198,245 | B1 | 3/2001 | Du et al. | 318/471 |
| 6,216,235 | B1 | 4/2001 | Thomas et al. | 715/501 |
| 6,219,723 | B1 | 4/2001 | Hetherington et al. | 710/18 |
| 6,272,642 | B2 | 8/2001 | Pole, II et al. | 713/300 |
| 6,298,448 | B1 | 10/2001 | Shaffer et al. | 713/322 |
| 6,384,651 | B1 | 5/2002 | Horigan | 327/175 |
| 6,397,340 | B2 | 5/2002 | Watts et al. | 713/322 |
| 6,415,388 | B1 | 7/2002 | Browning et al. | 713/322 |
| 6,434,714 | B1 | 8/2002 | Lewis et al. | 714/38 |
| 6,446,214 | B2 | 9/2002 | Chrysanthakopoulos | 713/310 |
| 6,542,940 | B1 | 4/2003 | Morrison et al. | 710/22 |
| 6,564,328 | B1 | 5/2003 | Grochowski et al. | 713/320 |
| 6,601,179 | B1 | 7/2003 | Jackson et al. | 713/322 |
| 6,684,341 | B1 | 1/2004 | Malcolm et al. | 713/320 |
| 6,694,442 | B2 | 2/2004 | Yeh | 713/322 |
| 6,754,690 | B2 | 6/2004 | Larson | 718/102 |
| 6,804,630 | B2 | 10/2004 | Lee et al. | 702/186 |
| 6,823,516 | B1 | 11/2004 | Cooper | 718/108 |
| 7,010,466 | B2 | 3/2006 | Lee et al. | 702/186 |
| 7,146,174 | B2 * | 12/2006 | Gardner et al. | 455/453 |
| 2001/0034850 | A1 * | 10/2001 | Atkinson | 713/320 |
| 2003/0045237 | A1 | 3/2003 | Gardner et al. | 455/63 |

FOREIGN PATENT DOCUMENTS

KR  90-5435  3/1990

OTHER PUBLICATIONS

SmartLine Inc., Dec. 14, 1999, Remote Task Manager.

* cited by examiner

PRIOR ART

METHOD AND APPARATUS FOR OPERATING A COMPUTER SYSTEM BY ADJUSTING A PERFORMANCE STATE OF A PROCESSOR RESOURCE

This application is a Continuation of U.S. patent application Ser. No. 09/850,059, filed May 8, 2001, now U.S. Pat. No. 7,131,016, entitled Method and Apparatus for Adjusting Clock Throttle Rate Based on Usage of CPU, and claims priority to Korean Patent Application No. 25787/2000, filed May 15, 2000, now Korean Patent No. 361340, entitled Controlling Method for CPU Clock. The entire disclosures of the prior applications are considered as being part of the disclosure of the present application and is hereby incorporated by reference herein.

BACKGROUND OF THE INVENTION

1. Field of the Invention

The present invention relates to a method and apparatus for adjusting the clock throttle rate of a central processing unit (CPU) included in a computer.

2. Background of the Related Art

A computer (or "system") 4, as illustrated in FIG. 1A, is commonly used with external output devices, such as a display monitor 6 and a printer 12, as well as external input devices, such as a keyboard 8 and a mouse 10. The power management of a system 4 is often controlled by external input devices.

A power management method in the related art will be described in conjunction with FIG. 1 which illustrates a related method for managing the electric power consumed in a system. Once the system is turned on (Step S10), the system 4 determines whether a signal has been inputted from an external input device, such as a keyboard or mouse, to the system for a predetermined period of time (Step S11). If there is a signal inputted from the external input device within a predetermined period of time, the system is maintained in its ON state. On the other hand, if no signal is inputted from the external input device for the predetermined period of time, the system is switched from its ON state to an idle mode (Step S12) to reduce the electric power consumed in the system.

In systems where an advanced power management (APM) is applied, the operational mode when no signal is inputted from the external input device for a certain period of time is referred to as an "idle mode" or "doze mode". When the system is switched to the "idle mode", the basic input/output system (BIOS) of the system conducts an operation for reducing the clock speed supplied to the CPU and decreasing LCD brightness, etc., thereby reducing the consumption of electric power.

For instance, a dedicated power management chipset such as an Intel PIIX4E power management chipset is mainly used as a means for conducting the above mentioned APM power management operation. Typically, this power management chipset adjusts the clock throttle rate of the CPU among 7 different levels of 12.5%, 25%, 37.5%, 50%, 62.5%, 75%, and 87.5%. That is, assuming that the maximum speed of the CPU corresponds to 100%, the clock throttle rate of the CPU can be stepwise adjusted in a range from 100% to 12.5% at a reduction rate of 12.5% per step using the dedicated power management chipset (Intel PIIX4E).

In order to control the clock rate of the CPU, a clock throttle operation is also carried out by controlling desired registers of the power management chipset (Intel PIIX4E). A user controls desired registers to adjust the set-up of the BIOS to enable an idle mode supporting item and the clock rate of the CPU selects one of 7 different levels designated by the BIOS of the system, typically, 50%.

Meanwhile, in a system where an advanced configuration and power interface (ACPI) is applied and the system is in a state of use by an application program, the system sets the CPU at a clock throttle rate of 100% and the switching of the system to an "idle mode" by the BIOS of the system is not carried out. On the other hand, when the CPU is not being used by an application program, the system conducts a power management operation setting the CPU to a lower clock throttle rate.

However, the above mentioned power management methods of the related art have problems. In the case of the system to which the APM is applied, the clock throttle rate is reduced to a predetermined rate (typically, 50%) only when the system is switched from its ON state to an idle state. For this reason, there is a problem in that no power management is carried out in the ON state of the system.

Furthermore, although it is not necessary to use external input devices when operating a digital video disk (DVD) or a video file to allow the user to watch a movie or a program broadcasted on the Internet, the system should be in the ON state because the system remains in operation. In this case, however, the system may maintain or switch into the idle state because of a lack of external input by the user, thus resulting in slower or intermittent reproduction of the data.

In the case of the system to which the ACPI is applied, it is possible to conduct power management while the system is in the ON state. However, the power management is very simple, in that clocks are operated at a clock throttle rate of 100% in the operating state of the CPU, but the clocks are cut off in the non-operating state of the CPU. In accordance with such a very simple power management, clocks are supplied to the CPU at a maximum clock throttle rate even in a situation in which an application program involving a less CPU usage is used. For this reason, an increased consumption of electric power occurs unnecessarily in the system.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Therefore, an object of the invention is to provide a method for adjusting the clock throttle rate of a CPU in a system, in which the usage of the CPU is measured, so that the clock throttle rate of the CPU can be adjusted in a stepwise fashion, based on the measured usage of the CPU, thereby allowing the CPU to be supplied with clocks at a rate necessary for the execution of a desired program without any influence on the performance of the system, and more particularly to a method for adjusting the clock throttle rate of a CPU included in a computer, in which the usage of the CPU is measured, so that the clock throttle rate of the CPU can be automatically adjusted, based on the measured usage of the CPU, thereby reducing the consumption of electric power without any influence on the performance of the computer.

Another object of the invention is to provide a method for adjusting the clock throttle rate of a CPU in a system, in which the usage of the CPU is measured, so that the clock throttle rate of the CPU can be adjusted in a stepwise fashion, based on the measured usage of the CPU, thereby reducing the consumption of electric power.

In order to accomplish these objects, the present invention provides a method for adjusting a clock throttle rate of a central processing unit (CPU), comprising measuring a usage of the CPU, comparing the measured CPU usage with a predetermined reference CPU usage range, and adjusting the clock throttle rate of the CPU, based on a result of the comparison. The measurement of the CPU usage is carried out at every refresh time. The CPU usage is measured by calculating an idle thread value of the CPU for a predetermined period of time. The CPU usage is measured by detecting registry information of the system.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
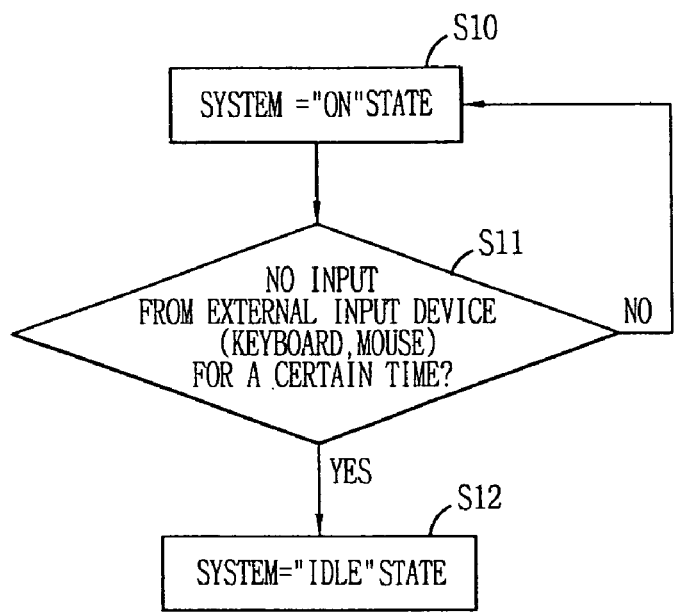
FIG. 1 is a flow chart illustrating a power management method in the related art used in a computer system.
Figure 2:
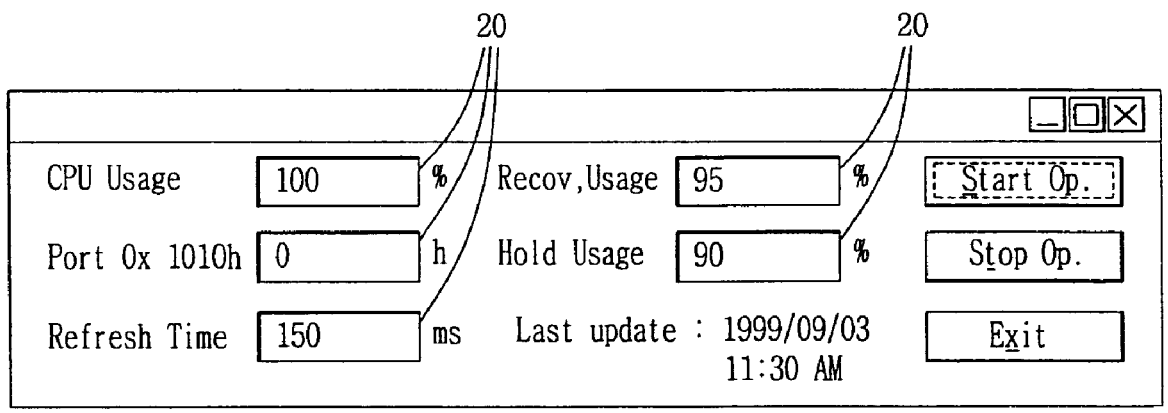
FIG. 2 illustrates the display window of an application program for carrying out a method for adjusting the clock throttle rate of a CPU in accordance with a preferred embodiment of the present invention.
Figure 1A:
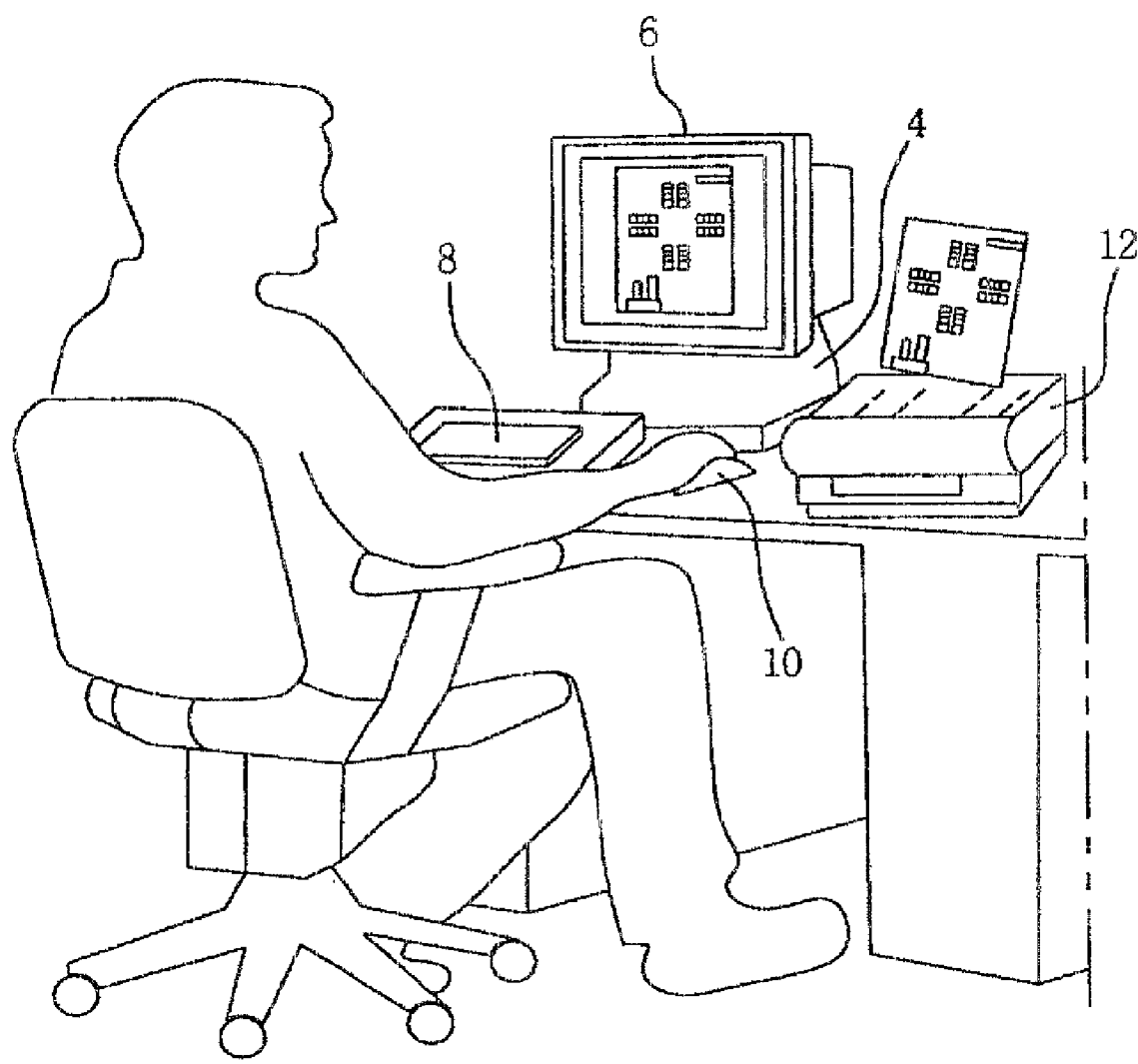
FIG. 1A illustrates a diagram of a computer system in the related art.

As shown in FIG. 2, the display window includes a plurality of sub-windows 20 for setting parameters required for the adjustment of the clock rate of a central processing unit (CPU), and menu bars. The sub-windows may, for example, include a sub-window "Hold Usage" representing a minimum reference usage of the CPU, a sub-window "Recov, Usage" representing a maximum reference usage of the CPU, a sub-window "CPU Usage" representing the current usage of the CPU, "Port 0x 1010h" representing an input/output register address, and "Refresh Time" representing a refresh time for refreshing the measurement of the CPU usage although other sub-windows may also be included.

In accordance with a preferred embodiment method of the present invention, desired parameters displayed on the display window are set to adjust the clock rate of the CPU at an environment setting step. For example, where the CPU usage is reduced to a value less than the minimum reference CPU usage set in the sub-window "Hold Usage" or set in a predetermined minimum reference CPU usage amount, the contents of those, which are associated with addresses 10H and 11H of input/output registers in a dedicated power management chipset (PIIX4E), that is, a register for determining a clock throttle rate and a register for enabling a clock throttle operation, are changed to reduce the clock rate of the CPU. Also, where the CPU usage is increased to a value more than the maximum reference CPU usage set in the sub-window "Recov, Usage" or set in a predetermined maximum reference CPU usage amount, the set register values are changed to increase the clock rate of the CPU. The CPU usage can be periodically measured at intervals of the refresh time set in the sub-window "Refresh Time" or at a predetermined interval of time that can be preset.

Figure 3:
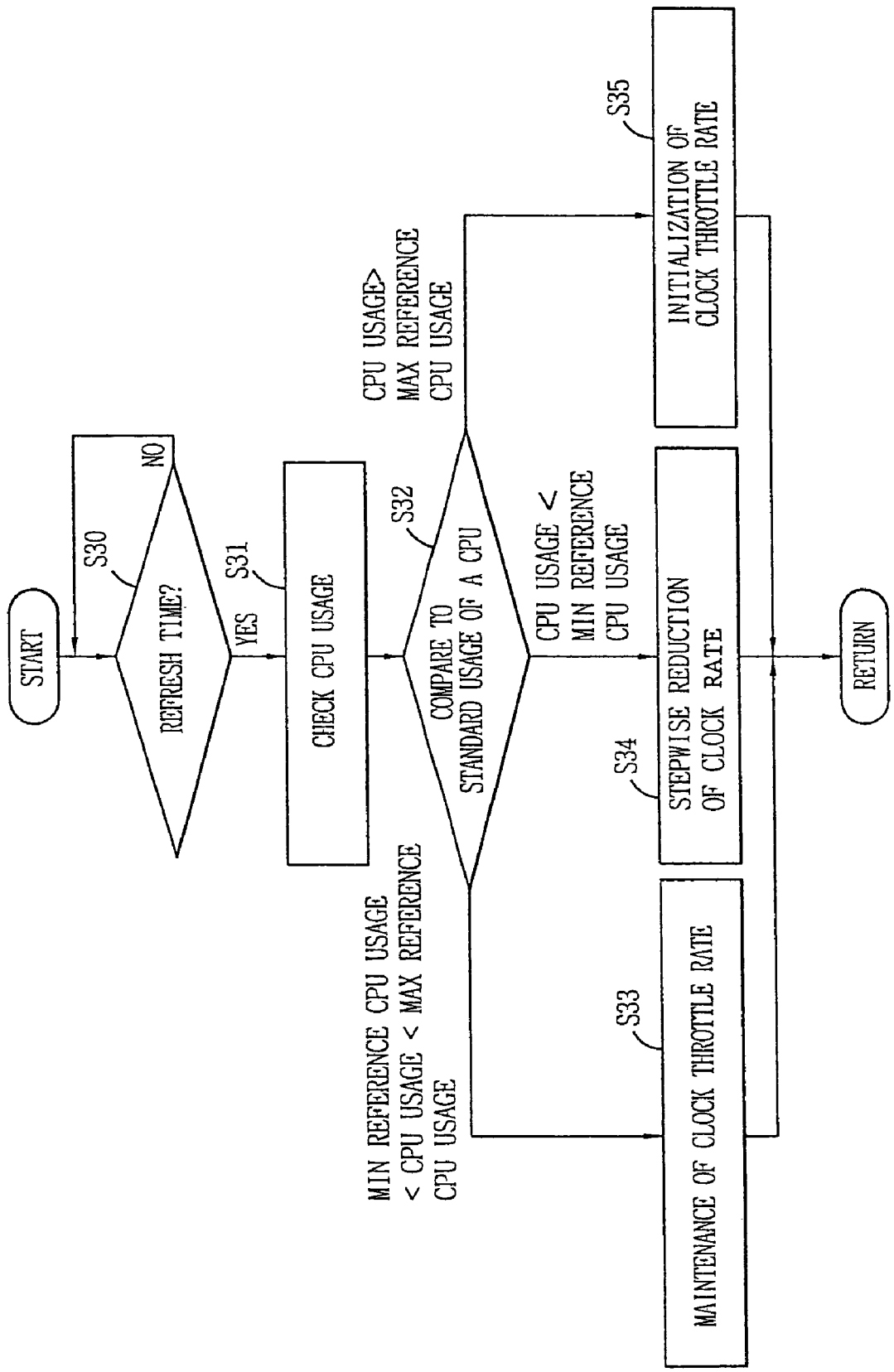
FIG. 3 is a flow chart illustrating the method for adjusting the clock throttle rate of the CPU in accordance with a preferred embodiment of the present invention.

FIG. 3 is a flow chart illustrating the method for adjusting the clock throttle rate of the CPU in accordance with a preferred embodiment of the present invention. In accordance with the method illustrated in FIG. 3, when the user enables a power management setting based on a CPU clock throttle rate adjustment, it is first determined whether the refresh time has elapsed (Step S30) and if the refresh time has elapsed, the usage of the CPU is measured (Step S31). The usage of the CPU may be measured by measuring an idle thread value of the CPU for a predetermined period of time or by detecting the CPU usage from the registry information of the system.

Thereafter, the measured CPU usage is compared with the minimum reference usage and maximum reference usage previously set using the display window of FIG. 2 (Step S32) or preset values. If the measured CPU usage is less than the minimum reference usage, the clock throttle rate of the CPU is stepwise increased, thereby reducing the clock rate of the CPU (Step S34). If the CPU usage measured after the reduction of the CPU clock throttle rate is still less than the minimum reference usage, the CPU clock throttle rate is then adjusted to a next higher value, thereby further reducing the clock rate of the CPU. This procedure is repeated until the measured CPU usage is not less than the minimum reference usage.

If the measured CPU usage is between the minimum and maximum reference usages, the current clock rate of the CPU is maintained as an optimum rate (Step S33). If the measured CPU usage is more than the maximum reference usage, the clock throttle rate of the CPU is initialized (Step S35) by recovering the clock rate of the CPU to a normal rate for improving system performance. The minimum and maximum reference usages may be appropriately determined, depending on the performance of the CPU.

Since the performance and power consumption of the system may vary considerably depending on the set values of the minimum and maximum reference usages, it may be desirable for those reference values to be set by the manufacturer rather than by the user. In this connection, it may be desirable to allow the user to determine whether it is necessary to enable the power management setting.

Figure 4:
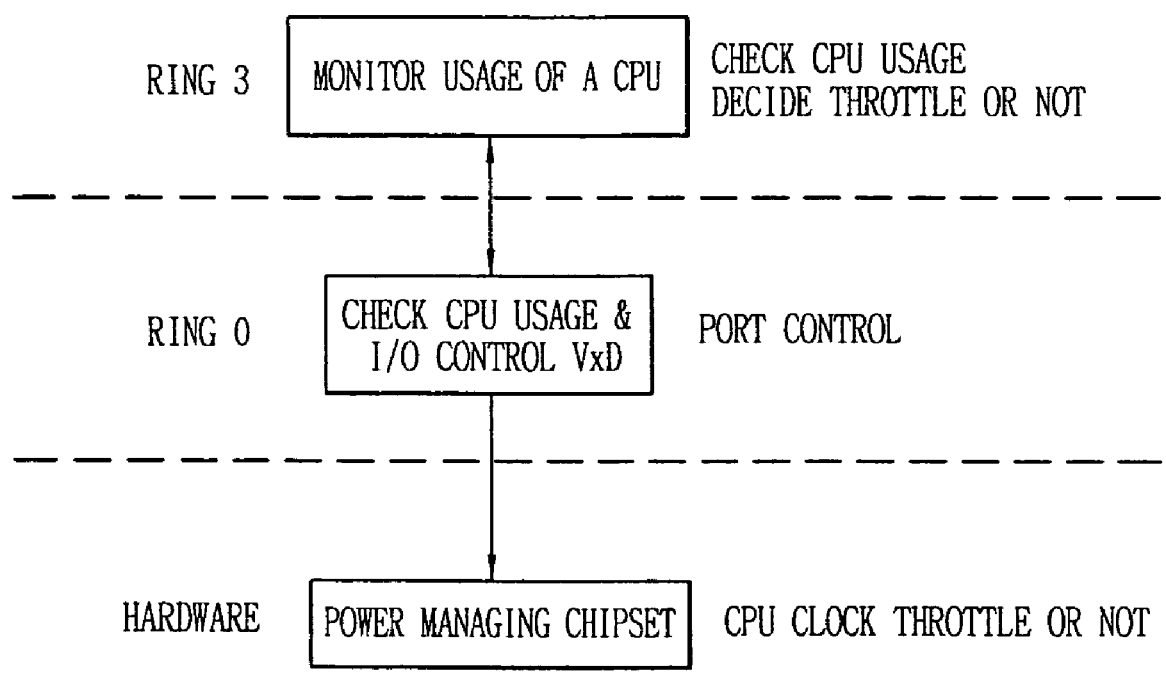
FIG. 4 is an architectural block diagram illustrating layers of an architecture configured in the system where a device driver is used.

As shown in FIG. 4, the architecture of the computer where a device driver is used includes a ring-3 layer, a ring-0 layer, and a hardware layer. The ring-3 layer is a user interface layer for enabling the clock throttle rate adjustment based on the usage of the CPU. The ring-0 layer is an intermediate layer that allows the user program to directly control the hardware layer with a device driver. When information set in the ring-3 layer is transmitted to the device driver in accordance with an input/output control of the ring-0 layer, the device driver reads the usage of the CPU, thereby controlling the dedicated power management chipset to reduce or increase the clock throttle rate of the CPU.

As apparent from the above description, the present invention provides a method of preventing degradation in the performance of a system by measuring the usage of the CPU included in the system, and appropriately controlling the clock throttle rate of the CPU based on the measured CPU usage. The present invention also reduces the consumption of electric power in the system by measuring the usage of the CPU included in the system, and appropriately controlling the clock throttle rate of the CPU based on the measured CPU usage. Additionally, where the preferred method of the present invention is applied to a notebook computer, it is also possible to extend a life time of a battery used in the notebook computer.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for operating a computing system, wherein a performance state of a processor resource is adjusted, comprising:
   measuring a usage of the processor resource to determine a measured usage;
   comparing the measured usage with a reference usage; and
   adjusting the performance state of the processor resource in accordance with the comparing by maximizing the performance state.

2. The method according to claim 1, wherein the reference usage comprises a range between a minimum reference usage and a maximum reference usage.

3. The method according to claim 1, wherein said adjusting is performed by:
   adjusting the value of a processor resource register; and
   changing the performance state to a maximum value.

4. The method according to claim 1, wherein the measured usage is greater than the reference usage.

5. The method according to claim 1, wherein said measuring comprises detecting processor register information of the computing system.

6. The method according to claim 1, wherein said measuring comprises calculating an idle value associated with the processor resource.

7. The method of claim 1, wherein the processor resource is comprised of a single CPU.

8. A computing system, comprising:
   a processing unit configured with an adjustable performance state;
   a processing measurement circuit to measure a usage of the processing unit to determine a measured usage;
   a processing usage comparison circuit to compare the measured usage with a reference usage; and
   a processing performance adjustment circuit to adjust the performance state of the processing unit in accordance with the comparison by maximizing the performance state.

9. The computing system according to claim 8, wherein the reference usage comprises a range between a minimum reference usage and a maximum reference usage.

10. The computing system according to claim 8, wherein said processing performance adjustment circuit is configured to:
    adjust a value of a processing unit performance register; and
    change the performance state to a maximum value.

11. The computing system according to claim 8, wherein the measured usage is greater than the reference usage.

12. The computing system according to claim 8, wherein said processing measurement circuit is configured to detect processing unit register information of the computing system to measure the usage.

13. The computing system according to claim 8, wherein the processing measurement circuit is configured to calculate an idle value associated with the processing unit to measure the usage.

14. The computing system of claim 8, wherein the computing system is a personal computer, and wherein the processing unit is a single CPU.

15. A computer, comprising:
    user interface means for enabling adjustment of a CPU performance state based on CPU usage;
    power management means for controlling the CPU performance state; and
    device driver means for reading CPU usage and controlling said power management means, wherein the device driver means comprises:
    a first circuit to measure a usage of the CPU,
    a second circuit to compare the measured CPU usage with a predetermined CPU reference usage, and
    a third circuit to adjust the CPU performance state responsive to the comparison by directly setting the CPU performance state to an operating maximum.

16. The computer according to claim 15, wherein the CPU performance state is directly set to a current operating maximum when the measured CPU usage is greater than the predetermined CPU reference usage.

17. The computer according to claim 15, wherein the CPU reference usage comprises a range between a minimum reference usage and a maximum reference usage.

18. The computer according to claim 15, wherein the CPU is a single CPU.

19. The computer according to claim 15, wherein a CPU register is used to automatically adjust the CPU performance state.

20. The computer according to claim 15, wherein the first circuit is configured to detect CPU register information of the computer.

21. The computer according to claim 15, wherein the first circuit is configured to calculate an idle value of the CPU using a thread calculation.

* * * * *